United States Patent [19]

Orbach et al.

[11] Patent Number: 5,802,489
[45] Date of Patent: *Sep. 1, 1998

[54] FRONT WHEEL DRIVE ENGAGEMENT CONTROL SYSTEM FOR AGRICULTURAL VEHICLES

[75] Inventors: Abraham Orbach, Naperville; William L. Schubert, Downers Grove, both of Ill.

[73] Assignee: Case Corporation, Racine, Wis.

[ * ] Notice: The term of this patent shall not extend beyond the expiration date of Pat. No. 5,505,267.

[21] Appl. No.: 339,486

[22] Filed: Nov. 14, 1994

[51] Int. Cl.⁶ .............. G06F 7/70; A01B 67/00; B60K 17/34
[52] U.S. Cl. .............. 701/50; 701/69; 701/81; 701/88; 701/89; 172/3; 172/4; 172/4.5; 172/7; 180/233; 180/247; 180/197; 477/176; 477/35
[58] Field of Search .............. 364/424.07, 426.02, 364/426.03, 424.1; 180/244, 249, 247, 248, 233, 245, 197; 192/4 A, 13 A, 13 R, 9, 21.2, 12 D, 18 D; 303/190, 113.1, 114.1, 145; 475/150, 221–225; 172/7, 6, 9, 191

[56] References Cited

U.S. PATENT DOCUMENTS

| | | | |
|---|---|---|---|
| 3,913,680 | 10/1975 | Carlson | 303/145 |
| 3,963,085 | 6/1976 | Vinton | 180/247 |
| 4,088,208 | 5/1978 | Goode | 192/4 A |
| 4,282,933 | 8/1981 | Suganami et al. | 172/4.5 |
| 4,456,108 | 6/1984 | Kageyama | 192/4 A |
| 4,466,519 | 8/1984 | Römer | 180/244 |
| 4,511,014 | 4/1985 | Makita | 364/424.098 |
| 4,518,044 | 5/1985 | Wiegardt et al. | 180/197 |
| 4,714,127 | 12/1987 | Fanti et al. | 364/424.1 |
| 4,746,173 | 5/1988 | Fennel et al. | 180/244 |
| 4,781,265 | 11/1988 | Weiler et al. | 364/426.035 |
| 4,811,811 | 3/1989 | Bergene | 180/244 |
| 4,878,559 | 11/1989 | Moon et al. | 180/244 |
| 4,887,689 | 12/1989 | Naito | 364/424.1 |
| 4,895,217 | 1/1990 | Hueckler et al. | 180/233 |
| 4,951,775 | 8/1990 | Kittle et al. | 180/244 |
| 4,979,092 | 12/1990 | Bergene et al. | 364/424.07 |
| 5,019,985 | 5/1991 | Yasuno et al. | 364/426.029 |
| 5,031,704 | 7/1991 | Fleischer et al. | 172/191 |
| 5,054,573 | 10/1991 | Bennett | 180/244 |
| 5,132,908 | 7/1992 | Eto et al. | 364/426.035 |
| 5,152,347 | 10/1992 | Miller | 172/7 |
| 5,190,111 | 3/1993 | Young et al. | 364/424.07 |
| 5,270,930 | 12/1993 | Ito et al. | 364/424.1 |
| 5,421,416 | 6/1995 | Orbach et al. | 364/424.07 |
| 5,461,568 | 10/1995 | Morita | 364/426.034 |
| 5,492,194 | 2/1996 | McGinn et al. | 364/424.1 |
| 5,505,267 | 4/1996 | Orbch et al. | 364/424.07 |
| 5,549,166 | 8/1996 | Orbach et al. | 364/424.07 |
| 5,574,643 | 11/1996 | Yesel | 364/426.034 |

FOREIGN PATENT DOCUMENTS

| | | |
|---|---|---|
| 0 049 961 | 9/1981 | European Pat. Off. . |
| 2946477A1 | 4/1981 | Germany . |
| 3015379A1 | 10/1981 | Germany . |
| 738295 | 10/1955 | United Kingdom . |
| 2190339 | 11/1987 | United Kingdom . |

OTHER PUBLICATIONS

Abstract for 51–112031 and Abstract 53–111938 Massey-Ferguson 3600 no date.
MF 3000 Series Advertising Literature No date.

Primary Examiner—Jacques H. Louis-Jacques
Attorney, Agent, or Firm—Foley & Lardner

[57] ABSTRACT

A control system for engaging, disengaging and re-engaging a front wheel drive in an agricultural vehicle includes a control circuit configured to receive signals representative of vehicle operating parameters and to generate control signals corresponding to the desired state (i.e. engaged or disengaged) of a front wheel drive engagement circuit. Sensors are associated with the rear wheels, rear service brakes, implement positioning circuit, the vehicle body and the front axle to provide parameter signals related to wheel speed, braking, implement position and vehicle speed. Control logic executed by the control circuit in a continuously cycled routine determines the desired state of the engagement circuit based upon all operating parameters. The control circuit applies an appropriate control signal to the engagement circuit causing engagement or disengagement in accordance with the desired state.

22 Claims, 4 Drawing Sheets

| PARAMETER | STATE | CASE | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| IMPLEMENT POSITION | HIGH | + | + | + | + | + | + | | | | | | |
| | LOW | | | | | | | + | + | + | + | + | + |
| BRAKING CONDITION | NONE | + | + | | | | | | | | | | |
| | SINGLE | | | + | + | | | + | + | | | | |
| | DOUBLE | | | | | + | + | | | + | + | + | + |
| SPEED | HIGH | + | | + | | + | | + | | + | | + | |
| | LOW | | + | | + | | + | | + | | + | | + |
| DIFFERENTIAL LOCK STATE | ON | + | + | + | + | + | + | + | + | + | + | + | + |
| | OFF | | | | | | | | | | | | |
| MFD STATE | ON | + | + | + | + | + | + | | | | | | |
| | OFF | | | | | | | + | + | + | + | + | + |

FIG. 3

| PARAMETER STATE | | CASE | | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| IMPLEMENT POSITION | HIGH | + | | | | | + | | | | | | |
| | LOW | | + | + | + | + | | + | + | + | + | + | + |
| BRAKING CONDITION | NONE | + | | | | | | | | | | | |
| | SINGLE | | | | + | | | + | + | + | + | | |
| | DOUBLE | | + | + | | + | + | | | | | + | + |
| SPEED | HIGH | + | | + | + | + | + | | | + | + | + | + |
| | LOW | | + | | | | | + | + | | | | |
| DIFFERENTIAL LOCK STATE | ON | + | + | + | + | + | + | + | + | + | + | + | + |
| | OFF | | | | | | | | | | | | |
| MFD STATE | ON | + | + | + | + | + | + | + | + | + | + | + | + |
| | OFF | | | | | | | | | | | | |

FIG. 4

FRONT WHEEL DRIVE ENGAGEMENT CONTROL SYSTEM FOR AGRICULTURAL VEHICLES

BACKGROUND OF THE INVENTION

The present invention relates generally to a control system for engaging and disengaging the front wheel drive train in an agricultural vehicle. More particularly, the invention relates to a control system capable of automatically coupling the engine of such a vehicle to the front wheels based upon the sensed state of various parameters including wheel slip, braking, implement position and vehicle speed.

It has long been recognized that rear wheel drive vehicles, particularly agricultural work vehicles such as tractors, can suffer from loss of traction under certain conditions, such as when pulling heavy loads or traveling over loose or slippery surfaces. This loss of traction most often results from delivering a greater torque to the driven wheels than the interface between the tires and ground surface can resist, resulting in excessive wheel slip. Ultimately, such loss of traction can severely limit the load that can be effectively applied to the vehicle as well as the rate of production, and can lead to time consuming maneuvering of the vehicle to escape loose or slippery ground.

One technique that has been proposed to alleviate this problem and provide improved traction is to drive an additional set of wheels, most often the front wheels. While such four-wheel drive vehicles may be equipped to permanently drive front and rear wheels, they are more commonly provided with a clutch or similar arrangement for engaging and disengaging the front wheel drive train, thus permitting an operator to select two-wheel drive for normal or road operation and four-wheel drive for heavier work on difficult terrain.

A number of approaches have been developed for automatically engaging or disengaging a secondary drive axle, such as when one or both rear service brakes are applied for steering or stopping, or when a predetermined road speed is reached. Such known front wheel drive engagement arrangements permit a certain degree of automatic operation, thus relieving the operator from the distracting need to manually engage and disengage the drive and improving the safety and effectiveness of the vehicle. However, the convenience of vehicles equipped for selective engagement of a secondary drive axle could be greatly enhanced by further automation of engagement and disengagement decisions. For instance, it would be highly desirable to permit engagement of a front wheel drive train when rear wheel slip reaches a predetermined threshold level, thereby increasing the traction available to move the vehicle over soft or slippery ground. Furthermore, because traction on all four wheels of an agricultural vehicle may make steering difficult, it would be desirable to permit the front wheel drive train to be disengaged as the vehicle enters turns at the headlands of a field and re-engaged as the vehicle comes out of such turns. Moreover, it would be desirable to provide a control system for a front wheel drive train capable of processing inputs relating to a number of different operating parameters and commanding engagement and disengagement automatically and continuously depending upon the particular circumstances as indicated by the parameter inputs.

Accordingly, it would be desireable to provide a control system for a mechanical front wheel drive (MFD) on an agricultural vehicle that commands automatic engagement and disengagement of the MFD depending upon the slip of the driven wheels. In addition, such a control system would advantageously provide for automatic MFD engagement, disengagement and re-engagement based upon the position of an agricultural implement carried or towed by the vehicle. Furthermore, it would be advantageous to provide a control system for automatic MFD engagement and disengagement based upon a number of sensed operating parameters in combination, such as wheel slip, implement position, application of one or more service brakes and travel speed of the vehicle.

SUMMARY OF THE INVENTION

In accordance with one aspect of the invention, a control system is provided for an agricultural vehicle having an engine, a pair of rear wheels driven by the engine, a second pair wheels and an engagement circuit for coupling the second pair of wheels to the engine in response to control signals for driving the second pair of wheels. The control system includes a vehicle velocity sensor, a wheel velocity sensor, a comparator circuit and a control circuit. The vehicle velocity sensor is configured to detect a parameter related to the ground velocity of the vehicle and to generate a vehicle velocity signal representative of the parameter. The wheel velocity sensor is configured to detect the velocity of at least one of the first pair of wheels. The comparator circuit is coupled to the vehicle velocity sensor and to the wheel velocity sensor, and is configured to generate a slip signal representative of the degree of slip of at least one of the first pair of wheels. The control circuit is coupled to the comparator circuit and to the engagement circuit and is configured to generate control signals when a predetermined degree of slip occurs and to apply the control signals to the engagement circuit to engage the engine and thereby drive the second pair of wheels.

In accordance with another aspect of the invention, a control system is provided for an agricultural vehicle having an engine, a first pair of wheels driven by the engine, a second pair of wheels, an engagement circuit for selectively coupling the second pair of wheels to the engine in response to control signals for driving the second pair of wheels and an implement positioning system for raising and lowering an implement coupled to the vehicle. The control system includes an implement position detecting circuit and a control circuit. The implement position detecting circuit is coupled to the implement positioning system and configured to generate an implement position signal representative of the implement position. The control circuit is coupled to the implement position detecting circuit and to the engagement circuit and is configured to generate control signals and to apply the control signals to the engagement circuit to engage the engine and thereby drive the second pair of wheels when the implement is in a first position and to disengage the engine when the implement is in a second position.

In accordance with still another aspect of the invention, a control system is provided for an agricultural vehicle having an engine, a first pair of wheels driven by the engine, a brake associated with each of the driven wheels, a second pair of wheels, an engagement circuit for selectively coupling the second pair of wheels to the engine in response to control signals and means for positioning an implement. The control system includes first sensing means, second sensing means, third sensing means and a control circuit. Each of the sensing means is configured to sense a different operating parameter of the vehicle and to produce a corresponding parameter signal representative thereof. The control circuit is coupled to the first, second and third sensing means and to the engagement circuit and is configured to selectively couple the engine to the second pair of wheels in response to the first, second and third parameter signals.

BRIEF DESCRIPTION OF THE DRAWINGS

The present invention will become more fully understood from the following detailed description, taken in conjunction with the accompanying drawings, wherein like reference numerals refer to like parts, in which:

FIG. 3 is a table indicating states of various operating parameters and the presently preferred states of outputs of the control system depicted in FIG. 2 when rear wheel slip is within an acceptable range or when the vehicle is not equipped for control based on wheel slip; and FIG. 4 is a table indicating states of various operating parameters and the presently preferred states of outputs of the control system when the vehicle is equipped for slip-based control and rear wheel slip exceeds a predetermined threshold level.

DESCRIPTION OF THE PREFERRED EMBODIMENTS

Before beginning the detailed description of the preferred embodiments, several general comments will assist in understanding the scope of the invention.

First, throughout the following discussion the invention is described as it would be incorporated into an agricultural tractor. However, the invention is equally applicable to off-highway vehicles in general, where loss of traction may give rise to the need for differential locking or positive driving of multiple axles. Similarly, although reference is made throughout this description to front wheel drive, this term should be understood more generally to encompass selective assisted drive by a second axle, whether the second axle is in a front or a rear position.

Moreover, while a dedicated control circuit is illustrated and described for implementing the invention, the present system may be incorporated into a multipurpose or general purpose controller with tasks other than those described herein. Similarly, while the tractor and control circuit described herein are adapted for control of both mechanical front wheel drive (MFD) and differential locking (DIFFLOCK) of the driven wheels, these two functions may be divided between separate controllers and, where desired, MFD or DIFFLOCK control may be provided alone.

Finally, the present system features a novel control scheme that significantly reduces the need for operator intervention in engaging, disengaging and re-engaging DIF-FLOCK and MFD circuits and mechanisms. Such mechanisms are generally biased on or off, that is, engaged or disengaged, based upon the desired default state of the mechanism in the event of failure of a controller or other important elements in the control system. Depending upon the normally biased state, the control system must generally provide signals tending to move the corresponding devices to their non-biased state, removing these signals where the biased state is desired. Therefore, throughout the following discussion, where reference is made to control signals tending to engage, disengage or re-engage the controlled devices, it is understood that the appropriate signals may in fact actuate the device into its non-biased state or simply permit the device to return to its biased state.

Figure 1:
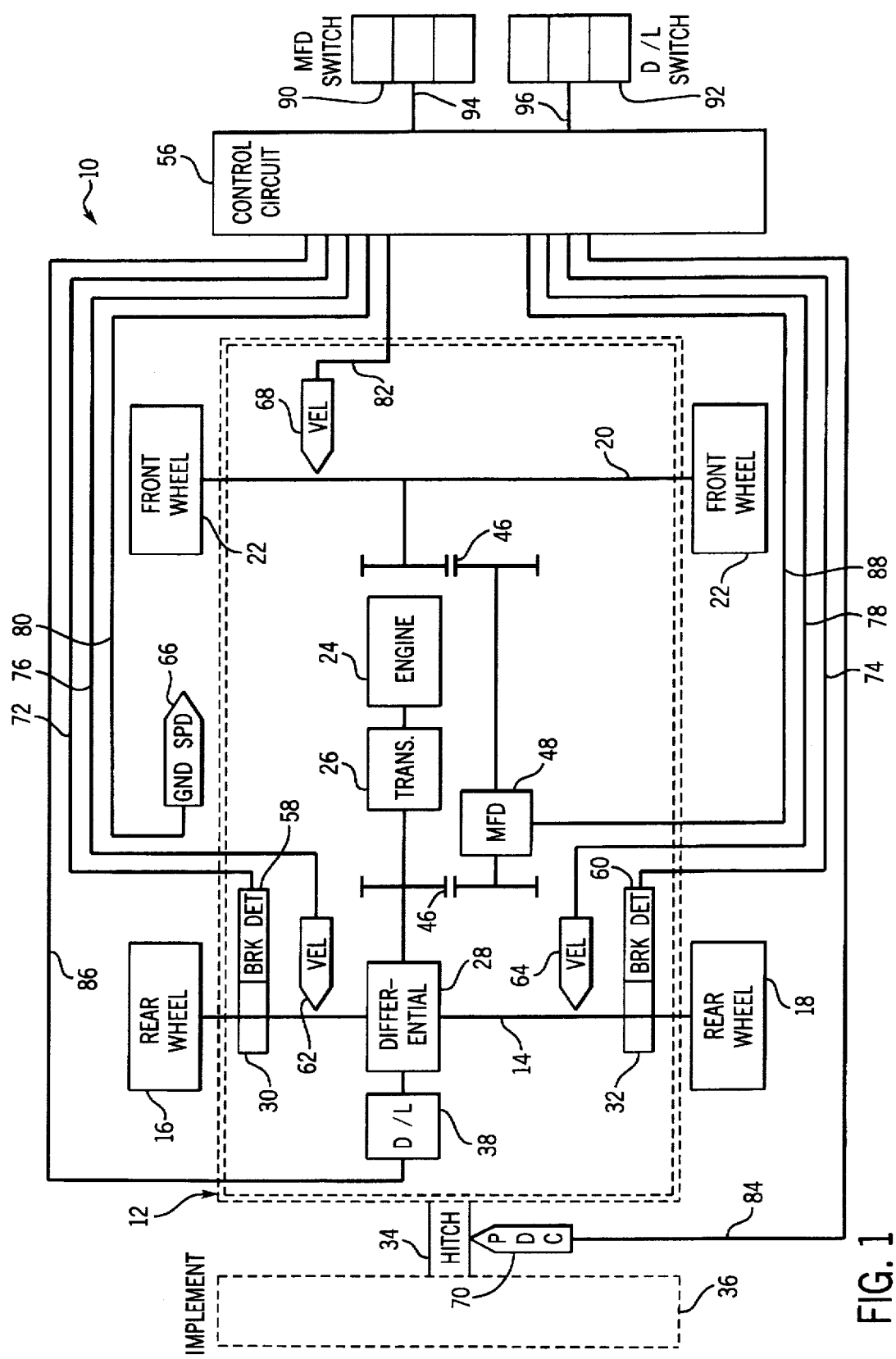
FIG. 1 is a diagrammatical representation of an tractor equipped with a control system in accordance with the invention.

Turning now to the drawings and referring to FIG. 1, a control system 10 for an agricultural vehicle such as a tractor 12 is illustrated schematically. Tractor 12, represented in double-dashed lines, includes a rear axle 14 coupled to rear wheels 16, 18 and a front axle 20 coupled to front wheels 22. An engine 24 provides power for driving rear wheels 16, 18 through a transmission 26 and differential 28 coupled to rear axle 14. As will be discussed in greater detail below, while front wheels 22 are steerable and are not driven during normal operation of tractor 12, engine 24 may be selectively coupled to front wheels 22 to provide additional traction when necessary. Further power transmission elements may be coupled to engine 24 and transmission 26 for driving implements and performing auxiliary functions, such as via a power take off drive (not shown).

Left and right service brakes 30 and 32 are provided on axle 14 for independently braking rear wheels 16 and 18 respectively. Brakes 30 and 32 are coupled to independent brake peddles through a power assist circuit of conventional design (not shown). Brakes 30 and 32 may be applied simultaneously to limit the rotation of both rear wheels 16, 18 for stopping, or either brake may be operated alone, such as for steering.

Tractor 12 may include an implement positioning device 34, such as a three-point hitch, for raising and lowering an implement 36, such as a ground-working implement. Alternatively, tractor 12 may include a draw-bar arrangement capable of towing an implement 36, in which case implement positioning device 34 may be included on the towed implement. In the latter case, tractor 12 is considered to include the towed implement for the purposes of control system 10. Implement positioning device 34 is generally responsive to operator-induced commands through a hitch or implement control system (not shown) of generally known design.

During normal operation of tractor 12, differential 28 permits relative velocity between rear wheels 16 and 18, that is, differential 28 allows rear wheels 16 and 18 to turn at different speeds. Such relative velocity may result incidentally during driving, such as during cornering due to the different turn radii of wheels 16 and 18. Moreover, an operator may expressly cause wheels 16 and 18 to rotate at different speeds, such as for steering, by application of a single service brake 30 or 32. The use of differential 28 and brakes 30 and 32 for steering is common, for example, for tight cornering or routine steering corrections during field work, particularly in furrowed fields.

Figure 2:
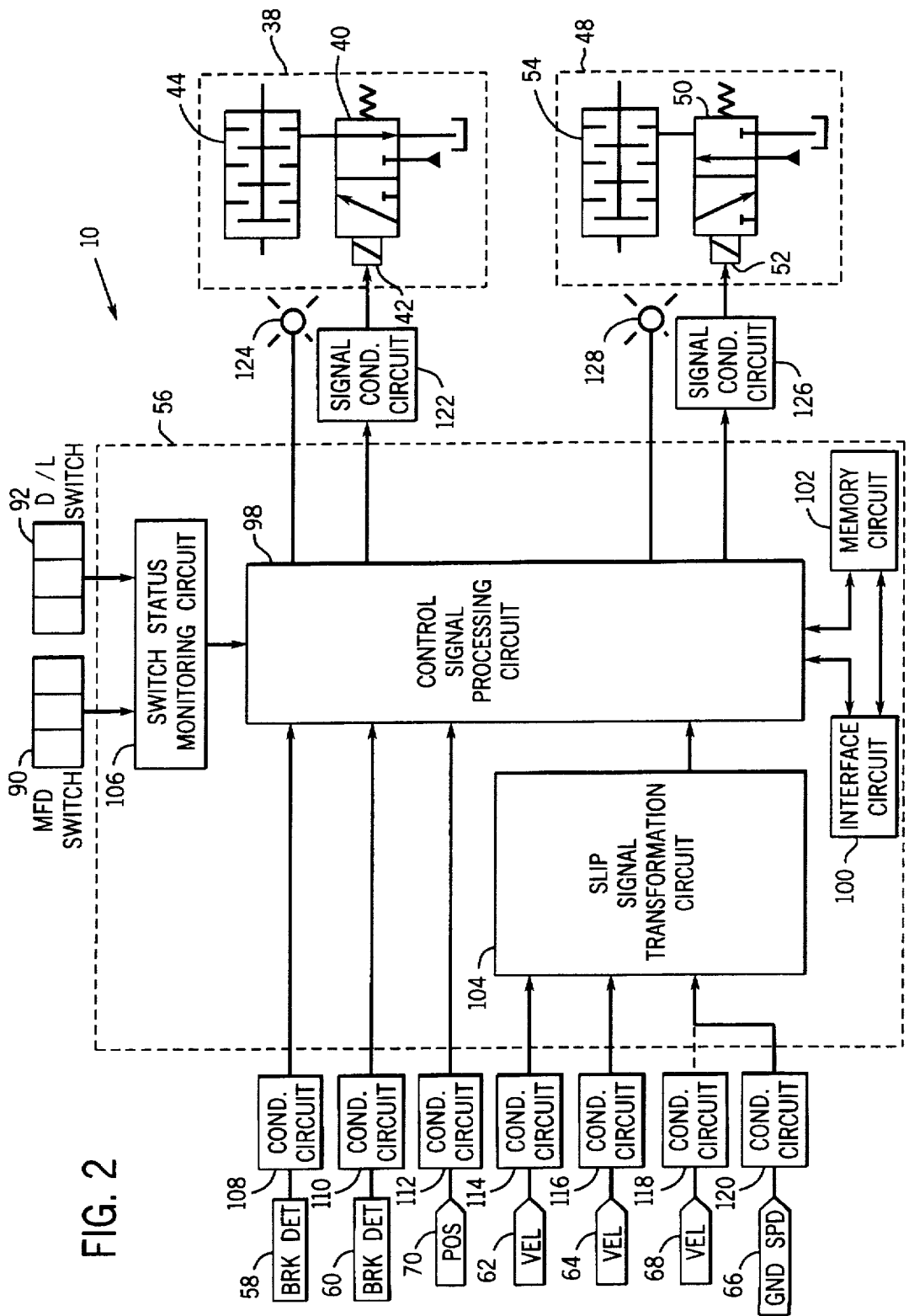
FIG. 2 is a data flow diagram of the present control system illustrating the sensing devices, control devices and signal processing paths present in a preferred embodiment of the invention as depicted in FIG. 1.

Differential 28 is coupled to a differential locking mechanism (DIFFLOCK mechanism) 38 for selectively limiting the relative velocity between rear wheels 16 and 18. DIF-FLOCK mechanism 38 is preferably of conventional design, such as the locking mechanism currently installed on the 7200 series tractors manufactured by Case Corporation of Racine, Wis. By way of example, as illustrated in FIG. 2, DIFFLOCK mechanism 38 typically includes a control valve 40 coupled to the tractor's hydraulic system and actuated by a solenoid coil 42, and a multi-disc hydraulic clutch 44 in fluid communication with control valve 40. Control valve 40 is spring-biased in a closed position whereby clutch 44 is not under fluid pressure and is thus disengaged when solenoid coil 42 is not energized. Thus, clutch 44 defaults to a disengaged state. In operation, when valve 40 receives electrical control signals from a control circuit 56, solenoid coil 42 is energized to shift valve 40 to an open position, routing pressurized fluid to clutch 44 for engagement, i.e. differential locking action. Alternatively, DIFFLOCK mechanism 38 may include an electric clutch or other locking device capable of selectively preventing differential action between wheels 16 and 18 in response to electrical signals from control circuit 56.

Returning to FIG. 1, front wheels 22 may be coupled to engine 24 through transmission 26 and a drive train including gearing 46 and an MFD engagement circuit 48. Engagement circuit 48 is preferably of known construction, such as currently available on the 7200 series tractors manufactured by Case Corporation. As shown in FIG. 2, engagement circuit 48 typically includes a control valve 50 coupled to the tractor's hydraulic system and actuated by a solenoid coil 52, and a multi-disc hydraulic clutch 54 in fluid communication with valve 50. Control valve 50 is spring-biased in an open position, whereby clutch 54 is engaged when solenoid coil 52 is not energized. Thus, clutch 54 defaults to an engaged state whereby front wheels 22 are driven by engine 24 such that in the event of failure of solenoid coil 52 or any component communicating signals to coil 52, clutch 54 is engaged. Clutch 54 may be selectively disengaged to uncouple engine 24 from axle 20 by applying control signals from control circuit 56 to valve 50 to energize solenoid coil 52 and shift valve 50 to its closed position. Alternatively, MFD engagement circuit 48 may include an electric clutch arranged to complete or to interrupt the drive train between engine 24 and front wheels 22 in response to control signals from control circuit 56. Moreover, front axle 20 may include an MFD differential, similar to differential 28, permitting front wheels 22 to rotate at different speeds when clutch 54 is engaged. When an MFD differential is provided, a differential locking arrangement similar to that coupled to differential 28 may also be provided to selectively prevent differential action of the MFD drive.

Referring again to FIG. 1, control system 10 includes a control circuit 56 configured to generate control signals for engaging and disengaging DIFFLOCK mechanism 38 and MFD engagement circuit 48 based upon the state of certain operating parameters of tractor 12. Control system 10 further includes a number of sensors and sensing circuits for detecting operating parameters of tractor 12 and generating signals representative thereof. These signals are communicated to control circuit 56 and are processed to determine the desired state of DIFFLOCK mechanism 38 and MFD engagement circuit 48, i.e. engaged or disengaged. Based upon these desired states, control circuit 56 applies appropriate engagement and disengagement control signals to mechanism 38 and circuit 48.

In the presently preferred embodiment, control system 10 includes the following parameter sensors and sensing circuits: brake detecting circuits 58 and 60, left and right rear wheel velocity sensors 62 and 64, true ground speed sensor 66, front wheel velocity sensor 68 as an alternative to ground speed sensor 66 and an implement position detecting circuit 70.

Brake detecting circuits 58 and 60 are coupled to left and right service brakes 30 and 32 respectively and generate signals representative of the current state of the brakes. For example, brake detecting circuits 58, 60 may include electrical switches arranged to produce a signal when the associated brake is engaged and no signal when the brake is disengaged.

Wheel velocity sensors 62 and 64 are provided for detecting the rotational speed of rear wheels 16 and 18. Velocity sensors 62 and 64 preferably include variable inductance type magnetic proximity sensors associated with timing or drive gears for producing pulsed signals, the frequencies of which are proportional to the rotational speed of wheels 16 and 18. True ground speed sensor 66, such as a radar emitter and receiver unit, is mounted to tractor 12 and configured to generate signals representative of the tractor speed. By way of example, true ground speed sensor 66 may be of the type optionally available on the 7200 series tractors manufactured by Case Corporation. As an alternative to sensor 66, wheel velocity sensor 68, which is essentially identical to velocity sensors 62 and 64 may be provided for sensing the rotational speed of front wheels 22 as an indication of ground speed.

Implement position detecting circuit 70 is coupled to implement positioning device 34 and generates signals representative of the actual position of implement 36. Implement position detecting circuit 70 may include a potentiometer, linear variable differential transformer, or similar device for producing a signal proportional to the implement position. It should be noted that the present system preferably considers actual implement position for DIFFLOCK and MFD control, as opposed to an operator set position command or desired position value. Because implement positioning devices 34 generally respond to position command changes with some delay and may not reflect the commanded implement position, it has been found that the use of actual implement position provides a more timely and reliable input for DIFFLOCK and MFD engagement and disengagement decisions. However, in particular applications where actual implement position cannot be sensed or no unacceptable time delay exists between position command changes and actual implement position changes, an operator set position command value could be considered by control circuit 56 for the present control purposes.

As shown diagrammatically in FIG. 1, sensors 58, 60, 62, 64, 66, 68 and 70 are coupled to control circuit 56 via data links 72, 74, 76, 78, 80, 82 and 84 respectively and apply signals to control circuit 56 over these links. In addition, control circuit 56 is coupled to DIFFLOCK mechanism 38 and to MFD engagement circuit 48 via conductors 86 and 88 respectively. An MFD switch 90 and a DIFFLOCK switch 92 are also coupled to control circuit 56 via conductors 94 and 96 respectively. In the presently preferred embodiment, MFD switch 90 is a three-position switch with positions corresponding to "MFD OFF", "MFD ON" and "AUTO" mode. DIFFLOCK switch 92 is also preferably a three-position switch with positions corresponding to "OFF", "AUTO" and a momentary contact position "MOMENTARY ON". Both MFD switch 90 and DIFFLOCK switch 92 are located in a control console in the tractor cab (not shown) and coupled to the tractor's electrical supply system for completing circuits to control circuit 56 when actuated by an operator. In operation, control circuit 56 continuously cycles through a control routine in which it monitors the status of switches 90 and 92. If either switch is in its "AUTO" position, control circuit 56 generates control signals corresponding to the desired states of DIFFLOCK mechanism 38 and MFD engagement circuit 48, i.e. engaged or disengaged, in accordance with control logic described below based upon the current states of operating parameters as detected by sensors and detecting circuits 58 through 70. These control signals are applied to mechanism 38 and circuit 48 via conductors 86 and 88 to complete the control function by engaging or disengaging mechanism 38 and circuit 48.

The configuration of DIFFLOCK and MFD switches 92 and 90 permits automatic control of mechanism 38 and circuit 48 as well as more conventional manual selection or override of the state of these devices. In particular, when DIFFLOCK switch 92 is momentarily depressed to its "MOMENTARY ON" position, DIFFLOCK mechanism 38 is engaged without the intermediary of control circuit 56. Thereafter, mechanism 38 remains engaged until one or both service brakes 30, 32 are applied. When DIFFLOCK switch 92 is placed in its "OFF" position, mechanism 38 disengages and remains disengaged.

Similarly, when MFD switch 90 is depressed to its "ON" position, MFD engagement circuit 48 is engaged and remains engaged until switch 90 is moved out of the "ON" position. When switch 90 is placed in its "OFF" position, circuit 48 is disengaged. However, when in the manually set "OFF" state, MFD engagement circuit 48 is engaged temporarily during simultaneous application of both service brakes 30 and 32, to provide positive braking at all four wheels.

It will be appreciated that switches 90 and 92 thus offer an operator the option of disabling or overriding control circuit 56. In addition, should partial or complete failure of control circuit 56 or another key element in control system 10 occur, switches 90 and 92 allow an operator to command engagement and disengagement of DIFFLOCK mechanism 38 and MFD engagement circuit 48 as in existing equipment. Moreover, while the switch configuration described above is preferred, similar disabling and override functions can be achieved with alternative switch arrangements, such as two separate switches for overriding (i.e. enabling and disabling) automatic control for manual engagement and disengagement and for selecting automatic control if enabled.

FIG. 2 illustrates the typical interrelation of the various components of control system 10 as well as the flow of signals between these components. Control circuit 56 includes a control signal processing circuit 98, an operator interface circuit 100, a memory circuit 102, a slip signal transformation circuit 104 and a switch status monitoring circuit 106, all of which may be incorporated into an appropriately configured microprocessor. Operator interface circuit 104 permits interruption of the normal operation of control circuit 56, such as for diagnostic functions and calibration of control system 10. Interface circuit 100 is preferably coupled to a control console in the tractor cab through which an operator may input calibration data and check or monitor the status of various calibration values and operating parameters. Memory circuit 102 typically includes read only memory circuits (ROM) configured to store the program executed by circuit 98, electronically erasable programmable read only memory circuits (EEPROM) configured to store calibration values used in executing the control functions and random access memory (RAM) configured to temporarily store values required for execution of the control routine. However, other types of memory or data storage may be used, and some or all of memory circuit 102 may be included in a microprocessor programmed to carry out the present control functions or external memory devices may be used. Slip signal transformation circuit 104 is configured to receive inputs related to vehicle and wheel speeds, to compare and process these values and to generate a slip signal representative of the slip of driven wheels 16 and 18 as will be described in greater detail below. Finally, switch status monitoring circuit 106 monitors the operator-set status (i.e. position) of MFD and differential lock switches 90 and 92 and transmits this information to circuit 98 for modifying the control functions executed by control system 10 accordingly.

Left and right brake detecting circuits 58 and 60 are coupled to control circuit 56 via associated conditioning circuits 108 and 110 respectively, which may be integral to control circuit 56. Circuits 108 and 110 provides appropriate filtering to eliminate switch bounce. However, depending upon the control circuit 56 and the circuits 58 and 60 used to generate the braking signals, circuits 108 and 110 may be eliminated. The signals produced by circuits 58 and 60, conditioned by circuits 108 and 110, are applied to digital inputs of circuit 98. Similarly, implement position detecting circuit 70 is coupled to control circuit 56 through conditioning circuit 112 and the conditioned signal representative of the position of implement 36 is applied to a digital input of circuit 98.

Left and right wheel velocity sensors 62 and 64, velocity sensor 68 (when present) and true ground speed sensor 66 are coupled to slip signal transformation circuit 104 through conditioning circuits 114, 116, 118 and 120 respectively. These conditioning circuits filter radio and other undesirable frequencies or interference from the signals produced to the associated sensors. Additionally, as required by the particular sensors used, conditioning circuits 114, 116, 118 and 120 place the signals produced by the sensors within a 5 volt range and provide these signals with a generally squarewave configuration which can be appropriately sampled by transformation circuit 104.

Control circuit 56 is configured to apply control signals to DIFFLOCK mechanism 38 through an appropriate amplification and signal conditioning circuit 122. In the presently preferred embodiment, control circuit 56 applies an "on/off" signal to solenoid coil 42 of valve 40 through circuit 122 causing clutch 44 to receive pressurized fluid and thus to engage, limiting differential action of differential 28. Alternatively, control valve 40 may be a proportional valve capable of throttling the supply of pressurized fluid to clutch 44 and control circuit may be configured to provide pulse-width-modulated (PWM) control signals to coil 42. Where control circuit 56 applies such PWM signals to coil 42, the duty cycle of the signals may be varied to obtain particular engagement and disengagement rates or characteristics (e.g. ramped). In addition, an indicator 124 is provided in the tractor cab and coupled to control circuit 56. An energizing signal is supplied to illuminate indicator 124 whenever control circuit 56 supplies a signal tending to engage DIFFLOCK mechanism 38, thereby informing the vehicle operator that mechanism 38 is engaged.

Similarly, control circuit 56 provides control signals to MFD engagement circuit 48 via an amplification and signal conditioning circuit 126. While these control signals are generally "on/off" signals for engaging or disengaging clutch 54 by energizing or de-energizing coil 52 to shift valve 50, valve 50 may be a proportional valve and control circuit 56 may provide PWM signals, the duty cycle of which may be varied for control of the engagement and disengagement rates of MFD engagement circuit 48. Finally, an MFD engagement indicator 128 is provided in the tractor cab and coupled to control circuit 56. Indicator 128 receives an energizing signal from control circuit 56 whenever a control signal is output tending to engage MFD engagement circuit 48, thereby informing the operator that circuit 48 is engaged.

Control system 10 uses information related to wheel and vehicle velocity to calculate a degree of wheel slip in each cycle through its control routine. As discussed above, wheel velocity sensors 62 and 64 provide signals representative of the rotational speed of rear wheels 16 and 18. Alternatively, a single sensor may be associated with the rear axle 14 and a signal from that sensor used to calculate wheel slip. Wheel velocity signals generated by sensors 62 and 64 are related to apparent vehicle velocity in slip signal transformation circuit 104 by first converting the signals to a rotational velocity value (e.g. by dividing the signal pulse rate by the number of teeth on the timing gear associated with the sensor). This rotational velocity value is then converted into an apparent vehicle velocity value by multiplying the rotational velocity value by the circumference of rear wheels 16 and 18. The circumference value used in this step is preferably generated from a wheel diameter value stored in memory circuit 102 during initial calibration of control system 10. The apparent vehicle velocity value is then subtracted from a true vehicle velocity value generated directly from the signal received from ground speed sensor 66 to obtain a wheel slip value. Finally, in the preferred embodiment, the resulting slip value is divided by the true vehicle velocity value to obtain a percentage slip value. As an alternative to ground velocity sensor 66, front wheel velocity sensor 68 may be used to provide an indication of vehicle ground speed. Where front wheel velocity sensor 68 is used, ground speed is computed in circuit 104 by first dividing the pulse rate of the signal generated by sensor 68 by the number of teeth in the timing gear associated with the sensor, and multiplying the resulting value by the circumference of the front wheels 22 (e.g. based on a front wheel diameter value stored in memory circuit 102 during calibration of control system 10).

It should be noted that in the preferred embodiment of control system 10, an important operating parameter considered by control circuit 56 for engagement, disengagement and re-engagement of DIFFLOCK mechanism 38 and MFD engagement circuit 48 is vehicle speed or true ground speed. Thus, while control circuit 56 utilizes the detected vehicle speed for generating a value of wheel slip, the vehicle speed value is also transmitted to signal processing circuit 98 for automatic control of mechanism 38 and circuit 48 as will be described below.

Control logic particularly suited for implementation by control system 10 will now be described with reference to FIGS. 3 and 4. Control system 10 permits engagement, disengagement and re-engagement of DIFFLOCK mechanism 38 and MFD engagement circuit 48 in response to the state of a number of different operating parameters of tractor 12. While the specific parameters on which control system 10 bases control decisions regarding engagement of mechanism 38 and circuit 48 may vary, in the presently preferred embodiment these parameters include implement position, braking conditions, vehicle speed and wheel slip. Other parameters, such as steering angle and implement draft force, may be included in the control logic implemented by control system 10 with corresponding sensors and signal conditioning circuits being provided for supplying control circuit 56 with information related to the state of such parameters. Moreover, control system 10 may be configured for control based upon more or fewer parameter state inputs depending upon the type of vehicle being controlled and typical conditions anticipated. In particular, control system 10 may be installed on vehicles without slip-based control, i.e. not equipped for sensing vehicle and wheel velocities or controlling based upon the degree of wheel slip. FIG. 3 indicates the desired states of mechanism 38 and circuit 48 for various scenarios or combinations of parameter states when slip-based control is installed and wheel slip is within an acceptable range, i.e. below a predetermined threshold level. Where control system 10 is installed on a vehicle without control based upon wheel slip, the desired states indicated in FIG. 3 are implemented by control system 10 regardless of the degree of wheel slip. FIG. 4 shows the desired states of mechanism 38 and circuit 48 when control system 10 is equipped for slip-based control and slip exceeds a predetermined threshold level.

The parameter states considered by control system 10 are as follows. Control system 10 monitors implement position as sensed by detecting circuit 70 and classifies this position as either "high" or "low". An implement is generally considered to be in high position when it is above a predetermined threshold height, which may be expressed as a percentage of its total travel, such as 90%. Positions below that threshold are considered "low". For the purposes of control logic, a "low" implement position is considered indicative that work is currently being performed by the vehicle, such as plowing, grading or the like. Three possible braking conditions are considered by control system 10, including "none", "single" and "double", depending upon the number of rear service brakes currently applied. Application of either left or right service brake 30, 32 alone is considered indicative of steering adjustments. Application of both service brakes ("double") is considered indicative of stopping. Control system 10 monitors vehicle speed as computed by transformation circuit 104 from signals from ground speed sensor 66, or from wheel velocity sensor 68 if present. Alternatively, the output of a speedometer could supply this parameter input. However, where the vehicle is equipped for slip-based control it is generally more convenient to use the vehicle velocity value generated by transformation circuit 104. A vehicle speed above a predetermined level, such as 7 miles per hour, is considered "high", whereas speeds below that level are considered "low". For vehicles equipped for slip-based control, control system 10 generally considers slip to be either "high" (i.e. above a predetermined threshold, such as 15%) or "low" (i.e. below the threshold). The various threshold levels may be stored permanently in memory circuit 102 or may be configured into memory circuit 102 during calibration of control system 10. Moreover, it is possible to reconfigure or update the various threshold levels during a subsequent calibration of control system 10. Alternatively, all or some of the threshold levels may be operator-set, such as by command potentiometers on a control console in the vehicle cab.

As discussed above, in the present system DIFFLOCK mechanism 38 may be selectively disengaged by an operator by setting DIFFLOCK switch 92 to the "OFF" position. Thus, switch 92 may be used to disable mechanism 38. Similarly, an operator may manually engage mechanism 38 by momentarily depressing switch 92 in the "MOMENTARY ON" position. Once manually engaged in this manner, DIFFLOCK mechanism 38 will remain engaged until one or both of service brakes 30, 32 are used, at which time mechanism 38 will be disengaged. Moreover, an operator may select automatic control of engagement, disengagement and re-engagement of DIFFLOCK mechanism 38 by placing switch 92 into the "AUTO" position.

When control circuit 56 detects that DIFFLOCK switch 92 is in the "AUTO" position, control circuit 56 generates control signals for engaging, disengaging and re-engaging mechanism 38 based upon the state of one or more operating parameters as shown in FIGS. 3 and 4. FIG. 3 illustrates the preferred states of DIFFLOCK mechanism 38 for various possible combinations of states for implement position, braking and vehicle speed when wheel slip is below a predetermined threshold level, such as 15%, or when the vehicle being controlled is not equipped for slip-based control. FIG. 4 shows the preferred states of DIFFLOCK mechanism 38 for the same combinations of parameter states when the vehicle is equipped for slip-based control and wheel slip exceeds the threshold level.

As shown in FIG. 3, when wheel slip is below the threshold value, DIFFLOCK mechanism 38 is disengaged in all cases where the implement position is high (cases 1–6 in FIG. 3). In addition, mechanism 38 is disengaged when one or more service brakes is applied (cases 3–6 and 9–12). Finally, mechanism 38 is disengaged when the vehicle speed is found to be above the preset level discussed above, such as 7 miles per hour (cases 1, 3, 5, 7, 9 and 11). Consequently, in the presently preferred embodiment, when slip is below a predetermined slip threshold, or the vehicle is not equipped for slip-based control, mechanism 38 is engaged in a single combination of parameter conditions, designated case 8 in FIG. 3. This situation occurs when implement 36 is lowered, no brakes are applied and the vehicle is travelling at a speed below the predetermined speed threshold. When any one of these conditions changes, differential locking mechanism 38 is disengaged by control circuit 56. Such disengagement may occur, for example, during application of a single brake, such as for steering adjustments, during implement raising, such as at the headlands of a field during a half turn, or during higher speed movement of the tractor in a field. If, following such disengagement of mechanism 38, control circuit 56 detects that parameter conditions once again match those required for engagement (i.e. case 8 in FIG. 3), mechanism 38 is re-engaged. Thus, the present system alleviates the need for an operator to reset DIFFLOCK mechanism 38 following routine maneuver.

As illustrated in FIG. 4, when the vehicle is equipped for slip-based control and slip exceeds a predetermined threshold, control system 10 may cause engagement and re-engagement of DIFFLOCK mechanism 38 in an additional situation as compared with the scenarios considered above. This additional situation, designated case 2 in FIG. 4, occurs when the implement is raised, neither service brake is applied and the vehicle ground speed is below the threshold speed. Because this combination of parameter states typically occurs when tractor 12 is being turned, as at a headland, without the assistance of a service brake, it has been found desirable to engage DIFFLOCK mechanism 38 should wheel slip become excessive. Should control circuit 56 detect any change in parameter conditions resulting in a combination different from cases 2 and 8 it commands disengagement of mechanism 38. However, if following such disengagement, control circuit 56 detects that conditions once again match either of cases 2 or 8 and wheel slip exceeds the predetermined threshold, control circuit 56 commands re-engagement of mechanism 38. Similarly, if conditions match case 2 in FIG. 4 and slip temporarily falls below the slip threshold, control circuit 56 disengages mechanism 38. Thereafter, control circuit 56 will re-engage mechanism 38 if slip again exceeds the threshold or if the implement is lowered, resulting in case 8 in FIG. 3.

Control system 10 engages and disengages MFD engagement circuit 48 as follows. As discussed above, when MFD switch 90 is in its "OFF" position, circuit 48 is disengaged, but is engaged temporarily during simultaneous application of both service brakes 30 and 32 to provide positive braking at all four wheels. Thus, switch 90 may at least partially disable circuit 48. When MFD switch 90 is in its "ON" position, circuit 48 is continuously engaged. These manually controlled "OFF" and "ON" states of circuit 48 do not require intervention of control circuit 56. However, when MFD switch 90 is in its "AUTO" position, circuit 48 is engaged, disengaged and re-engaged automatically by control circuit 56 without requiring further operator intervention as discussed below.

When control circuit 56 detects that MFD switch 90 is in the "AUTO" position, control circuit 56 generates control signals for engaging, disengaging and re-engaging MFD engagement circuit 48 depending upon the current state of one or more operating parameters as illustrated in FIGS. 3 and 4. As illustrated in FIG. 3, control circuit 56 commands engagement of circuit 48 during application of both service brakes 30 and 32, regardless of the state of other operating parameters such as implement position and vehicle speed (cases 5, 6, 11 and 12 in FIG. 3). In addition, when slip is below a predetermined slip threshold, or the vehicle is not equipped for slip-based control, control circuit 56 commands engagement of circuit 48 when implement 36 is in a lowered position, neither or a single service brake is applied and the vehicle is travelling at a speed below the predetermined speed threshold (cases 8 and 10). Because the latter two cases generally occur as work is being performed by the vehicle, without and with single brake-assisted steering adjustments respectively, it has been found beneficial to provide traction at all wheels by engagement of circuit 48. As shown in FIG. 4, when tractor 12 is equipped for slip-based control and slip exceeds a predetermined threshold, control circuit 56 commands engagement of circuit 48 in all parameter state combinations. When operating conditions cause any of the above conditions to change, resulting in a case other than 5, 6, 8, 10, 11 or 12 in FIG. 3, or reducing wheel slip to below the slip threshold, control circuit 56 commands circuit 48 to disengage. If, following such disengagement, control circuit 56 detects that conditions again correspond to one of the combinations for which MFD engagement is desirable, control circuit 56 commands re-engagement of circuit 48.

It should be noted that a certain degree of hysteresis is preferably programmed into all differential lock and MFD engagement, disengagement and re-engagement decisions discussed above, to enhance stability of the system and reduce hunting. Such hysteresis generally requires that parameter changes that would cause control system 10 to alter the state of mechanism 38 or circuit 48 must subsist for a given time, such as 0.5 seconds, or number of control routine cycles, such as 5 successive cycles of 100 milliseconds, before being given effect. In addition, parameter values may be required to fall below or to exceed the associated parameter threshold by a predetermined amount before being considered to change the state of the parameter.

In addition to the desired states of DIFFLOCK mechanism 38 and MFD engagement circuit 48 based on various parameter states, in the presently preferred embodiment, a signal representative of the current state of DIFFLOCK mechanism 38 is applied as an input for automatic MFD control by control circuit 56. In accordance with this aspect of control system 10, when MFD switch 90 is in its "AUTO" position, MFD engagement circuit 48 is commanded to engage any time DIFFLOCK mechanism 38 is engaged. Thus, where switch 90 is in the "AUTO" position and an operator manually engages DIFFLOCK mechanism 38 by depressing DIFFLOCK switch 92 in the "MOMENTARY ON" position, control circuit 56 commands engagement of MFD engagement circuit 48 as well.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims. For example, because implement position is considered indicative of whether the vehicle is currently performing work (as opposed, for instance, to turning as a headland), other parameters or inputs may be considered in lieu of implement position, so long as reasonably related to the vehicle's current working status. Thus, similar information may be available from the position of an operator-set implement position command device or from the status of a switch for activating and deactivating an acreage counting system of the type currently available on the 7200 series tractors manufactured by Case Corporation.

We claim:

1. In an agricultural vehicle having an engine, a first pair of wheels driven by the engine, a second pair of wheels and an engagement circuit for selectively engaging and disengaging the second pair of wheels to the engine in response to control signals for driving the second pair of wheels, a control system comprising:

a vehicle velocity sensor including a radar emitter and a radar receiver configured to detect a parameter indicative of the ground velocity of the vehicle independent of the velocity of the second pair of wheels and to generate a vehicle velocity signal representative thereof;

a wheel velocity sensor configured to detect the velocity of at least one of the first pair of wheels and to generate a wheel velocity signal representative thereof;

a comparator circuit coupled to the vehicle velocity sensor and to the wheel velocity sensor and configured to compare the vehicle velocity signal and the wheel velocity signal and to generate a slip signal representative of the degree of slip of at least one of the first pair of wheels; and a control circuit coupled to the comparator circuit and to the engagement circuit and configured to generate control signals and to apply the control signals to the engagement circuit, wherein the control signals cause the engagement circuit to engage the engine and thereby drive the second pair of wheels when the degree of slip is above a predetermined value and to disengage the engine and thereby not drive the second pair of wheels when the degree of slip is below the predetermined value.

2. A control system as recited in claim 1 wherein the control circuit includes an operator interface for selectively enabling and disabling the engagement circuit.

3. A control system as recited in claim 1 wherein the engagement circuit includes a fluid clutch and a solenoid operated control valve operatively coupled to the clutch, and wherein the control circuit applies the control signals to the solenoid of the control valve to selectively engage and disengage the clutch.

4. A control system as recited in claim 1 wherein the vehicle velocity sensor detects a rate of displacement of the vehicle with respect to the ground.

5. A control system as recited in claim 1 wherein the vehicle velocity sensor detects the velocity of a non-driven wheel.

6. A control system as recited in claim 1 wherein a wheel velocity sensor is provided for each rear wheel, each of the wheel velocity sensors being configured to generate wheel velocity signals and to apply the wheel velocity signals to the comparator circuit, and wherein the control circuit is configured to generate control signals for limiting relative angular velocity between the driven wheels when slip of any driven wheel exceeds a predetermined threshold value.

7. A control system as recited in claim 1 wherein the wheel velocity sensor includes a magnetic proximity sensor.

8. A control system as recited in claim 1 wherein the comparator circuit and the control circuit are included in a programmed signal processor.

9. In an agricultural vehicle having an engine, a first pair of wheels driven by the engine, a pair of brakes each associated with one of the driven wheels, a second pair of wheels, an engagement circuit for selectively engaging and disengaging the second pair of wheels to the engine in response to control signals for driving the second pair of wheels, and an implement positioning system for raising and lowering an implement coupled to the vehicle, a control system comprising.

a vehicle velocity sensor configured to detect a parameter indicative of the ground velocity of the vehicle and to generate a vehicle velocity signal representative thereof;

a pair of brake detecting circuits each coupled to one of the brakes and configured to generate a brake signal representative of the state of the one brake;

an implement position detecting circuit coupled to the implement positioning system and configured to generate an implement position signal representative of the implement position; and a control circuit coupled to the vehicle velocity sensor, the brake detecting circuits, the implement position detecting circuit and to the engagement circuit and configured to generate control signals and to apply the control signals to the engagement circuit to engage the engine and thereby drive the second pair of wheels when the implement is in a working position, the ground velocity of the vehicle is below a predetermined speed threshold, and neither or a single brake is applied.

10. A control system as recited in claim 9 wherein the control circuit includes an operator interface for selectively enabling and disabling the engagement circuit.

11. A control system as recited in claim 9 wherein the engagement circuit includes a fluid clutch and a solenoid operated control valve operatively coupled to the clutch, and wherein the control circuit applies the control signals to the solenoid of the control valve to selectively engage and disengage the clutch.

12. A control system as recited in claim 9 wherein the control circuit is further configured to generate control signals causing the engagement circuit to re-engage the engine when the implement returns to the first position.

13. A control system as recited in claim 9 wherein the implement positioning system includes a hitch and the implement position detecting circuit includes a switch coupled to the hitch.

14. A control system as recited in claim 9 wherein the vehicle includes a drawbar for towing the implement, the implement positioning system includes a raising and lowering assembly on a towed implement and the implement position detecting circuit includes a switch coupled to the raising and lowering assembly.

15. A control system as recited in claim 9 wherein the implement position detecting circuit includes a sensor for detecting the actual elevation of the implement.

16. A control system as recited in claim 9 wherein the implement position detecting circuit includes a position command signal generator configured to generate a position command signal representative of the desired position of the implement and the implement position signal is derived from the position command signal.

17. A control system as recited in claim 16 wherein the implement position signal is derived from the position command signal after a predetermined time period.

18. In an agricultural vehicle having an engine, a first pair of wheels driven by the engine, a brake associated with each of the driven wheels, a second pair of wheels, an engagement circuit for selectively engaging and disengaging the second pair of wheels to the engine in response to control signals and means for positioning an implement, a control system comprising:

- first sensing means for sensing a first operating parameter of the vehicle and for producing a first parameter signal representative thereof, the first operating parameter being the position of the implement;
- second sensing means for sensing a second operating parameter of the vehicle and for producing a second parameter signal representative thereof;
- third sensing means for sensing a third operating parameter of the vehicle and for producing a third parameter signal representative thereof; and
- a control circuit coupled to the first sensing means, the second sensing means, the third sensing means and the engagement circuit and configured to generate control signals for selectively engaging and disengaging the engine to the second pair of wheels in response to the first parameter signal, the second parameter signal and the third parameter signal, whereby the second pair of wheels is driven or not driven, respectively.

19. A control system as recited in claim 18 wherein the second operating parameter and the third operating parameter are chosen from a group of operating parameters consisting of ground speed of the vehicle, the degree of slip of at least one of the first pair of wheels, and the state of either of the brakes associated with the first pair of wheels.

20. A control system as recited in claim 18 further comprising fourth sensing means for sensing a fourth operating parameter of the vehicle and for producing a fourth parameter signal representative thereof, and wherein the control circuit is further coupled to the fourth sensing means and configured to generate control signals for selectively coupling the engine to the second pair of wheels in response to the first parameter signal, the second parameter signal, the third parameter signal and the fourth parameter signal.

21. In an agricultural vehicle having an engine, a first pair of wheels driven by the engine, a pair of brakes each associated with one of the driven wheels, a second pair of wheels, an engagement circuit for selectively engaging and disengaging the second pair of wheels to the engine in response to control signals for driving the second pair of wheels, and an implement positioning system for raising and lowering an implement coupled to the vehicle, a control system comprising:

- a vehicle velocity sensor configured to detect a parameter indicative of the ground velocity of the vehicle and to generate a vehicle velocity signal representative thereof;
- a pair of brake detecting circuits each coupled to one of the brakes and configured to generate a brake signal representative of the state of the one brake;
- an implement position detecting circuit coupled to the implement positioning system and configured to generate an implement position signal representative of the implement position; and
- a control circuit coupled to the vehicle velocity sensor, the brake detecting circuits, the implement position detecting circuit and the engagement circuit and configured to generate control signals and to apply the control signals to the engagement circuit to engage the engine and thereby drive the second pair of wheels when the implement is in a working position and the vehicle velocity signal is below a predetermined speed threshold, regardless of the state of the brakes.

22. The control system of claim 21, further comprising a wheel velocity sensor coupled to the control circuit and configured to detect the velocity of at least one of the first pair of wheels and to generate a wheel velocity signal representative thereof, wherein the control circuit is further configured to compare the vehicle velocity signal and the wheel velocity signal and to generate a slip signal representative of the degree of slip of at least one of the first pair of wheels, and to generate the control signals to engage the engine and thereby drive the second pair of wheels when the degree of slip is above a predetermined value, when both brakes are applied, or when the implement is in the working position and the vehicle velocity signal is below the predetermined speed threshold.

* * * * *